May 20, 1924.
V. A. KLUG
1,494,554
LUGGAGE CARRIER FOR AUTOMOBILES
Filed July 28, 1922
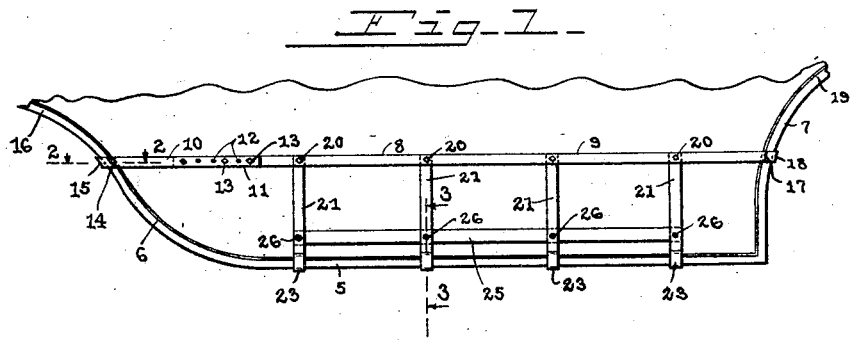
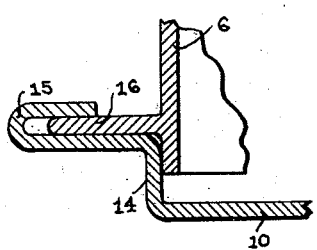
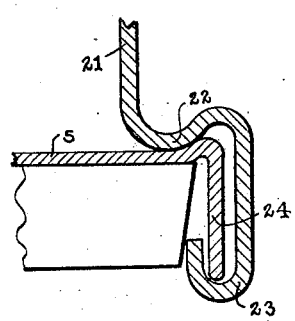
INVENTOR.
Victor A. Klug
BY
Morell & Keeney
ATTORNEYS.

Patented May 20, 1924.

1,494,554

UNITED STATES PATENT OFFICE.

VICTOR A. KLUG, OF MILWAUKEE, WISCONSIN.

LUGGAGE CARRIER FOR AUTOMOBILES.

Application filed July 28, 1922. Serial No. 578,250.

*To all whom it may concern:*

Be it known that I, VICTOR A. KLUG, a citizen of the United States, and resident of Milwaukee, in the county of Milwaukee and State of Wisconsin, have invented new and useful Improvements in Luggage Carriers for Automobiles, of which the following is a description, reference being had to the accompanying drawings, which are a part of this specification.

This invention relates to luggage carriers for automobiles and has for one of its objects to provide a device of this character which is especially, although not exclusively, adapted for use on Ford cars.

A further object of the invention is to provide a device of the character described which is readily attachable to and detachable from the running board of an automobile, and which may be readily folded when detached to occupy a minimum amount of space.

A still further object of the invention is to provide a luggage carrier which will be simple in construction, comparatively inexpensive to manufacture, and more efficient in use than those which have been heretofore proposed.

With the above and other objects in view, the invention consists in the novel details of construction and combinations of parts more fully hereinafter described and particularly pointed out in the appended claims.

Referring to the accompanying drawing in which like numerals designate like parts in all the views;

Figure 1 is a fragmentary side elevational view of an automobile showing a luggage carrier made in accordance with the present invention attached to the running board thereof.

Fig. 2 is an enlarged fragmentary horizontal sectional view, taken on the plane indicated by the line 2—2 of Fig. 1; and, Fig. 3 is a vertical sectional view, taken on the plane indicated by the line 3—3 of Fig. 1.

In the said drawing, the numeral 5 indicates the running board or step of a motor vehicle which is provided with the usual front mud-guard 6 and the rear-mud guard 7. The carrier constituting the present invention is attached to these elements and comprises a horizontal member 8 composed of two bars 9 and 10 of metal of suitable dimensions. The said bars overlap one another, as indicated at 11, and are provided with a plurality of registering perforations or holes 12, through which bolts 13 are adapted to pass in order to adjustably secure the two bars together.

The bar 10 is provided at its forward end with a shoulder 14 and with a hook portion 15, which is adapted to engage the flange 16 of the front mud-guard 6, as is clearly illustrated in Fig. 2. The bar 9 is provided with a similar shoulder 17 and hook portion 18, adapted to engage the flange 19 of the rear mud-guard 7, and the said bar 9 has pivotally secured to it, as by the bolts 20, a plurality of vertically extending members 21. The said members 21 are bent at their lower ends, as clearly shown in Fig. 3, and provide a shoulder 22 and a hook portion 23, which is adapted to engage the downwardly extending flange 24 of the step 5.

A relatively short bracing or reinforcing member 25 is pivotally secured, as by the bolts 26, to the members 21 near their lower ends, which member 25 not only serves to reinforce the carrier but also to more securely hold the luggage in place.

In attaching the carrier to the machine, the bolts 13 are first moved from the holes 12 and the bar 10 detached, whereupon the hook members 23 are engaged beneath the lower edge of the flange 24, and the hook member 18 is engaged with the flange 19 of the mud-guard 7. The hook 15 of the bar 10 is then engaged with the flange 16 of the front mud-guard 6, and the other end of the member 10 brought into co-operative relation with the perforated end of the bar 9, whereupon the bolts 13 may be replaced, thus securing the carrier in position.

The carrier is prevented from dropping by reason of the shoulders 22 of the members 21 resting upon the upper surface of the step 5, and longitudinal movement is prevented by reason of the engagement of the shoulders 14 and 17 with the surface of the front and rear mud-guards 6 and 7 respectively.

The carrier may be readily detached from the machine by reversing the procedure above outlined, and when so detached, it may be folded to occupy a minimum amount of space by simply moving the vertical members 21 about their pivotal connections 20 until the short member 25 occupies the same plane as the members 9 and 10.

It will thus be seen that this invention provides a simple and efficient carrier for retaining luggage in place upon the running board of a vehicle, which carrier may be readily attached to and detached from the said vehicle. Furthermore, when detached, the carrier may be folded to occupy a minimum amount of space, thereby especially adapting it to be carried in small machines where space is limited.

It is obvious that those skilled in the art may vary the details of construction and arrangement of parts without departing from the spirit of the invention and therefore it is not wished to be limited to the above disclosure except as may be required by the claims.

What is claimed is:

1. In a device of the class described the combination of an adjustable horizontal member the ends of which are bent to provide hook portions adapted to readily detachably engage flanges of the mud-guards of a vehicle; and vertical supporting members secured to said horizontal member, the lower ends of which are bent to provide integral hook portions adapted to readily detachably engage a flange of the step of said vehicle.

2. In a device of the class described the combination of an adjustable horizontal member the ends of which are bent to provide integral shoulders and hook portions adapted to readily detachably engage the mud-guards of a vehicle; and vertical supporting members pivotally secured to said horizontal member, and having their lower ends bent to provide integral shoulders and hook portions the latter being adapted to readily detachably engage a flange of the step of said vehicle.

3. In a device of the class described the combination of an adjustable horizontal member comprising a pair of overlapping bars detachably secured together one end of each bar being bent to provide integral shoulders and hook portions adapted to readily detachably engage the mud-guards of a vehicle; and vertical supporting members pivotally secured to said horizontal member, and having their lower ends bent to provide integral shoulders and hook portions, said shoulders being adapted to rest upon the upper surface of the step of the vehicle and hook portions being adapted to readily detachably engage the step of said vehicle.

In testimony whereof, I affix my signature.

VICTOR A. KLUG.